(12) United States Patent
Chen et al.

(10) Patent No.: US 11,979,496 B2
(45) Date of Patent: May 7, 2024

(54) SECRET ROTATION IN A CLOUD SERVICE

(71) Applicant: MICROSOFT TECHNOLOGY LICENSING, LLC, Redmond, WA (US)

(72) Inventors: Yongyu Chen, Nanjing (CN); Wei Deng, Suzhou (CN); Yizhong Wu, Shanghai (CN); Minming Guo, Shanghai (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 343 days.

(21) Appl. No.: 17/644,846

(22) Filed: Dec. 17, 2021

(65) Prior Publication Data

US 2023/0079608 A1    Mar. 16, 2023

Related U.S. Application Data

(60) Provisional application No. 63/244,710, filed on Sep. 15, 2021.

(51) Int. Cl.
*H04L 9/08* (2006.01)

(52) U.S. Cl.
CPC .................. *H04L 9/0891* (2013.01)

(58) Field of Classification Search
CPC .................................................... H04L 9/0891
USPC ........................................................ 380/277
See application file for complete search history.

(56) References Cited

U.S. PATENT DOCUMENTS 7,770,134 B2    8/2010  Evans et al.
7,822,206 B2 *  10/2010 Birk ...................... H04L 9/0891
                                                    380/278
8,325,924 B2 * 12/2012 Acar ..................... H04L 9/0833
                                                    380/44

(Continued)

FOREIGN PATENT DOCUMENTS

CN       111769950 A     10/2020
WO       2020258105 A1   12/2020

OTHER PUBLICATIONS

"International Search Report and Written Opinion Issued in PCT Application No. PCT/US22/04067360", dated Nov. 17, 2022, 14 Pages.

(Continued)

*Primary Examiner* — Dereena T Cattungal
(74) *Attorney, Agent, or Firm* — Shook, Hardy & Bacon L.L.P.

(57) ABSTRACT

The present technology provides a method to regenerate secrets while a version of the system is operational, thus avoiding the loss of availability that would have resulted from a system shutdown. The technology described herein may work in a computing context that assigns a first secret in an active role and a second secret in the backup role. The technology described herein activates a second instance of the service with the key not being regenerated serving as the active key. The second instance is then moved to the production mode and the first version of the service is moved to the staging mode. A new secret is generated and then assigned to the first instance of the service while it runs in the staging mode. Once the secret rotation is complete, the primary service instance is then moved back to the production mode with the new key configuration.

20 Claims, 12 Drawing Sheets

(56) References Cited

U.S. PATENT DOCUMENTS

| | | | |
|---|---|---|---|
| 8,964,990 | B1 | 2/2015 | Baer et al. |
| 9,009,277 | B2 | 4/2015 | Peters et al. |
| 10,523,434 | B1 * | 12/2019 | Sharifi Mehr ........ H04L 9/0891 |
| 10,630,682 | B1 | 4/2020 | Bhattacharyya et al. |
| 10,637,730 | B2 | 4/2020 | Chen et al. |
| 11,018,860 | B2 | 5/2021 | Ness et al. |
| 11,240,022 | B1 * | 2/2022 | Griffin .................. H04L 9/0891 |
| 2006/0075076 | A1 | 4/2006 | Sinha |
| 2011/0214113 | A1 * | 9/2011 | You ..................... H04L 41/0816 |
| | | | 717/168 |
| 2017/0331802 | A1 * | 11/2017 | Keshava ............... H04L 9/0894 |
| 2018/0123781 | A1 | 5/2018 | Ness et al. |
| 2018/0316676 | A1 | 11/2018 | Gilpin et al. |
| 2019/0286812 | A1 * | 9/2019 | Lounsberry ............. H04L 9/006 |
| 2020/0153616 | A1 * | 5/2020 | Savalle ................. H04L 9/0891 |

OTHER PUBLICATIONS

"AWS Secrets Manager", Retrieved from: https://docs.aws.amazon.com/secretsmanager/latest/userguide/secretsmanager-userguide.pdf#rotating-secrets-one-user-multiple-passwords, Apr. 23, 2020, 174 Pages.

"Azure Managed Storage Account Keys", Retrieved from: https://stackoverflow.com/questions/47776434/azure-managed-storage-account-keys?answertab=oldest#tab-top, Aug. 12, 2021, 2 Pages.

"Cloud Access Manager User Guide," Retrieved from: https://learn.akamai.com/en-us/webhelp/cloud-access-manager/cloud-access-manager-user-guide/GUID-49F7B4D9-17B0-4F55-9E86-22B389719A43.html, Aug. 12, 2021, 2 Pages.

"Fernet—Frequently Asked Questions", Retrieved from: https://web.archive.org/web/20210122043025/https://docs.openstack.org/keystone/latest/admin/fernet-token-faq.html, Jan. 22, 2021, 5 Pages.

"Key Rotation", Retrieved from: https://web.archive.org/web/20210422195459/https://cloud.google.com/kms/docs/key-rotation, Apr. 22, 2021, 3 Pages.

"Key Vault Managed Storage—Key Regeneration/Rotation", Retrieved from https://docs.microsoft.com/en-us/answers/questions/49016/key-vault-managed-storage-key-regenerationrotation.html, Jul. 17, 2020, 4 Pages.

"Keystone Documentation Release 19.1.0.dev15", Retrieved from: https://docs.openstack.org/keystone/latest/doc-keystone.pdf, Jul. 19, 2021, 757 Pages.

"Understanding Master Key Rotation", Retrieved from: https://web.archive.org/web/20140321230505/http://help.porticor.com/kb/product-backgrounders/understanding-master-key-rotation, Apr. 22, 2021, 1 Pages.

Baldwin, et al., "Automate the Rotation of a Secret for Resources that have Two Sets of Authentication Credentials", Retrieved from: https://docs.microsoft.com/en-us/azure/key-vault/secrets/tutorial-rotation-dual?tabs=azure-cli#key-vault-rotation-functions-for-two-sets-of-credentials Jun. 22, 2020, 14 Pages.

Downs, John, "Automatic Key Rotation for Azure Services", Retrieved from: https://blog.kloud.com.au/2018/09/19/automatic-key-rotation-for-azure-services/, Sep. 19, 2018, 11 Pages.

Katz, Eyal, "How to Maintain and Rotate Keys and Tokens with Zero Downtime", Retrieved from: https://dzone.com/articles/how-to-maintain-and-rotate-keys-and-tokens-with-ze, Apr. 6, 2021, 4 Pages.

Myers, et al., "Manage Storage Account Access Keys", Retrieved from: https://docs.microsoft.com/en-us/azure/storage/common/storage-account-keys-manage?tabs=azure-portal#use-azure-key-vault-to-manage-your-access-keys, Jun. 29, 2021, 6 Pages.

Peddada, Santosh, "Enabling Key Rotation on AWS using AWS Lambda Functions", Retrieved from: https://www.ibexlabs.com/enabling-key-rotation-on-aws-using-aws-lambda-functions/#:~:text=%20The%20automatic%20key%20rotation%20function%20built%20into,for%20services%20and%20keys%20that%20are...%20More%20, Jun. 17, 2020, 7 Pages.

* cited by examiner

```
                                                                    ┌─ 800
                                                                    ▼

┌─────────────────────────────────────────────────────────────────────────┐
│  DETERMINE THAT A SECRET ROTATION PROCESS IS TO BE INITIATED FOR        │
│  A FIRST SECRET AT A TIME WHEN THE FIRST SECRET IS ASSIGNED TO AN       │
│     ACTIVE SECRET ROLE FOR A FIRST INSTANCE OF A SERVICE AND A          │
│                 SECOND INSTANCE OF THE SERVICE                          │
│                               802                                       │
└─────────────────────────────────────────────────────────────────────────┘
                                   │
                                   ▼
┌─────────────────────────────────────────────────────────────────────────┐
│   ASSIGN A SECOND SECRET TO THE ACTIVE SECRET ROLE FOR A SECOND         │
│                      INSTANCE OF THE SERVICE                            │
│                               804                                       │
└─────────────────────────────────────────────────────────────────────────┘
                                   │
                                   ▼
┌─────────────────────────────────────────────────────────────────────────┐
│   AFTER ASSIGNING THE SECOND SECRET TO THE ACTIVE SECRET ROLE           │
│  FOR THE SECOND INSTANCE, INITIATE A FIRST TRANSITION OF THE FIRST      │
│  INSTANCE FROM A PRODUCTION MODE TO A STAGING MODE OF A CLOUD           │
│   ENVIRONMENT AND THE SECOND INSTANCE FROM THE STAGING MODE             │
│         TO THE PRODUCTION MODE OF THE CLOUD ENVIRONMENT                 │
│                               806                                       │
└─────────────────────────────────────────────────────────────────────────┘
                                   │
                                   ▼
┌─────────────────────────────────────────────────────────────────────────┐
│   AFTER COMPLETING THE FIRST TRANSITION, CAUSE REGENERATION OF          │
│         THE FIRST SECRET TO FORM A NEW FIRST SECRET                     │
│                               808                                       │
└─────────────────────────────────────────────────────────────────────────┘
                                   │
                                   ▼
┌─────────────────────────────────────────────────────────────────────────┐
│   ASSIGN THE NEW FIRST SECRET TO THE ACTIVE SECRET ROLE FOR THE         │
│                    FIRST INSTANCE OF THE SERVICE                        │
│                               810                                       │
└─────────────────────────────────────────────────────────────────────────┘
                                   │
                                   ▼
┌─────────────────────────────────────────────────────────────────────────┐
│  AFTER THE NEW FIRST SECRET IS IN THE ACTIVE SECRET ROLE FOR THE        │
│     FIRST INSTANCE, INITIATE A SECOND TRANSITION OF THE FIRST           │
│   INSTANCE FROM THE STAGING MODE TO THE PRODUCTION MODE AND             │
│ THE SECOND INSTANCE FROM THE PRODUCTION MODE TO THE STAGING             │
│              MODE OF THE CLOUD ENVIRONMENT                              │
│                               812                                       │
└─────────────────────────────────────────────────────────────────────────┘
```

┌─────────────────────────────────────────────────────────────────────┐
│  WHILE A SECOND INSTANCE OF A SERVICE IS IN A STAGING MODE AND A    │
│  FIRST INSTANCE OF THE SERVICE IS IN A PRODUCTION MODE IN A CLOUD   │
│  ENVIRONMENT, TERMINATING A RELATIONSHIP BETWEEN A FIRST SECRET     │
│            AND THE SECOND INSTANCE OF THE SERVICE                   │
│                                1002                                 │
└─────────────────────────────────────────────────────────────────────┘
                                    │
                                    ▼
┌─────────────────────────────────────────────────────────────────────┐
│   REASSIGN A SECOND SECRET FROM A BACKUP SECRET ROLE TO AN          │
│   ACTIVE SECRET ROLE FOR THE SECOND INSTANCE OF THE SERVICE         │
│                                1004                                 │
└─────────────────────────────────────────────────────────────────────┘
                                    │
                                    ▼
┌─────────────────────────────────────────────────────────────────────┐
│   INITIATE A FIRST TRANSITION OF THE FIRST INSTANCE FROM THE        │
│      PRODUCTION MODE TO THE STAGING MODE OF THE CLOUD               │
│  ENVIRONMENT AND THE SECOND INSTANCE FROM THE STAGING MODE          │
│     TO THE PRODUCTION MODE OF THE CLOUD ENVIRONMENT                 │
│                                1006                                 │
└─────────────────────────────────────────────────────────────────────┘
                                    │
                                    ▼
┌─────────────────────────────────────────────────────────────────────┐
│  AFTER COMPLETING THE FIRST TRANSITION, CAUSE REGENERATION OF       │
│        THE FIRST SECRET TO FORM A NEW FIRST SECRET                  │
│                                1008                                 │
└─────────────────────────────────────────────────────────────────────┘
                                    │
                                    ▼
┌─────────────────────────────────────────────────────────────────────┐
│  ASSIGN THE NEW FIRST SECRET TO THE ACTIVE SECRET ROLE FOR THE      │
│             FIRST INSTANCE OF THE SERVICE                           │
│                                1010                                 │
└─────────────────────────────────────────────────────────────────────┘
                                    │
                                    ▼
┌─────────────────────────────────────────────────────────────────────┐
│  AFTER THE NEW FIRST SECRET IS IN THE ACTIVE SECRET ROLE FOR THE    │
│     FIRST INSTANCE, INITIATE A SECOND TRANSITION OF THE FIRST       │
│   INSTANCE FROM THE STAGING MODE TO THE PRODUCTION MODE AND         │
│  THE SECOND INSTANCE FROM THE PRODUCTION MODE TO THE STAGING        │
│              MODE OF THE CLOUD ENVIRONMENT                          │
│                                1012                                 │
└─────────────────────────────────────────────────────────────────────┘
```

*FIG. 10.*

SECRET ROTATION IN A CLOUD SERVICE

CROSS-REFERENCE TO RELATED APPLICATIONS

This application claims the benefit of U.S. Provisional Application No. 63/244,710, filed Sep. 15, 2021, the entirety of which is hereby incorporated by reference.

BACKGROUND

In modern times, information services are provided by computerized systems. A computerized system must verify the identity of a principal (i.e. an entity, such as a user or an application) that requests access to the resources of the computerized system, based on an identifier. The principal provides a secret with the identifier to serve as a basis that authenticates the principal to receive the information service.

Cryptographic systems are designed to provide secrets to be used by principals and by computerized systems. A cryptographic system may provide a secret for a cryptographic period, or epoch. When a cryptographic period ends, a secret performing an authentication function is replaced by a new secret.

Cryptographic systems influence the speed and availability of a computerized system for an intended user. A system with cryptography causes a delay for an intended user while the computerized system performs cryptographic functions, such as generating a secret or performing an authentication operation. The responsiveness and availability of a computerized system may be lessened due to these delays and due to related computer maintenance operations. Often, recommended cryptographic periods are not used and secrets remain fixed for long periods of time, resulting in a system that is vulnerable.

Generally, secrets such as certificates, passwords, storage account keys, shared access signatures (SAS), and the like have a life cycle. At the end of life, the secret can expire or otherwise become invalid and/or untrusted. As such, secrets need to be renewed from time to time. In systems, such as data centers in which secrets can be used, renewing secrets without causing service disruptions is a challenge.

Current methods of secret renewal often require the service to be shut down when a secret is retired and replaced. In one aspect, the shutdown of the service is required because the computing environment only allows secrets to be installed upon startup of the service. In other words, a hot swap of an existing secret with a new secret is not possible in some environments.

There is a general need to provide improved cryptographic operations that are more regular, that result in greater system availability, less delay, and that are easier to use, while still providing protection against an unintended user, or an attacker.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present technology provides a method to regenerate secrets while a version of the system is operational, thus avoiding the loss of availability that would have resulted from a system shutdown. Current methods of secret renewal often require the service to be shut down when a secret is retired and replaced. In one aspect, the shutdown of the service is required because the computing environment only allows secrets to be installed upon startup of the service. In other words, a hot swap of an existing secret with a new secret is not possible in some environments. The technology described herein allows a secret to be replaced in such an environment without disrupting the service during the rotation. The proposed solution reduces downtime that can result from current methods of secret rotation, which require the service to be shut down during secret rotation. The proposed technology provides a more secure system, with shorter cryptographic epochs, while achieving greater availability. Thus, in the event of a compromised system, the exposure time before the cryptographic secrets are replaces is shorter, and the system is more secure, and less vulnerable to attack.

The technology described herein may work in a computing context where a service has an active secret and a backup secret. The technology described avoids disruption of the service by activating a second instance of the service. The second instance is set up to be authenticated by the secret that is not being regenerated and to use only that secret without a second key as a backup. The second instance may be initially set up in a staging mode of the cloud service. Once the second instance is initiated and not associated with the secret to be generated as either an active or backup secret, then it transitioned from the staging to production mode where it is able to provide the service in the cloud environment. The original instance of the service, which is still associated with the key to be regenerated, is transitioned to a staging mode.

The key is then regenerated while the original instance is in staging mode. During the rotation process, the second instance is providing the service in the cloud environment. This allows an instance of the service to provide the service while the secret is rotated. A new secret is generated to replace the secret being rotated. The new secret is then assigned to the first instance of the service while it runs in the staging mode. Once the secret rotation is complete, the primary service instance is then moved back to the production mode with the new key configuration. The second instance is returned to the staging mode. The secrets may then be rotated for the second instances of the service.

BRIEF DESCRIPTION OF THE DRAWINGS

The technology described herein is illustrated by way of example and not limitation in the accompanying figures in which like reference numerals indicate similar elements and in which:

FIG. 8 is a flow diagram showing a method of secret rotation, in accordance with an aspect of the technology described herein;

FIG. 10 is a flow diagram showing a method of secret rotation, in accordance with an aspect of the technology described herein;

DETAILED DESCRIPTION

Figure 1:
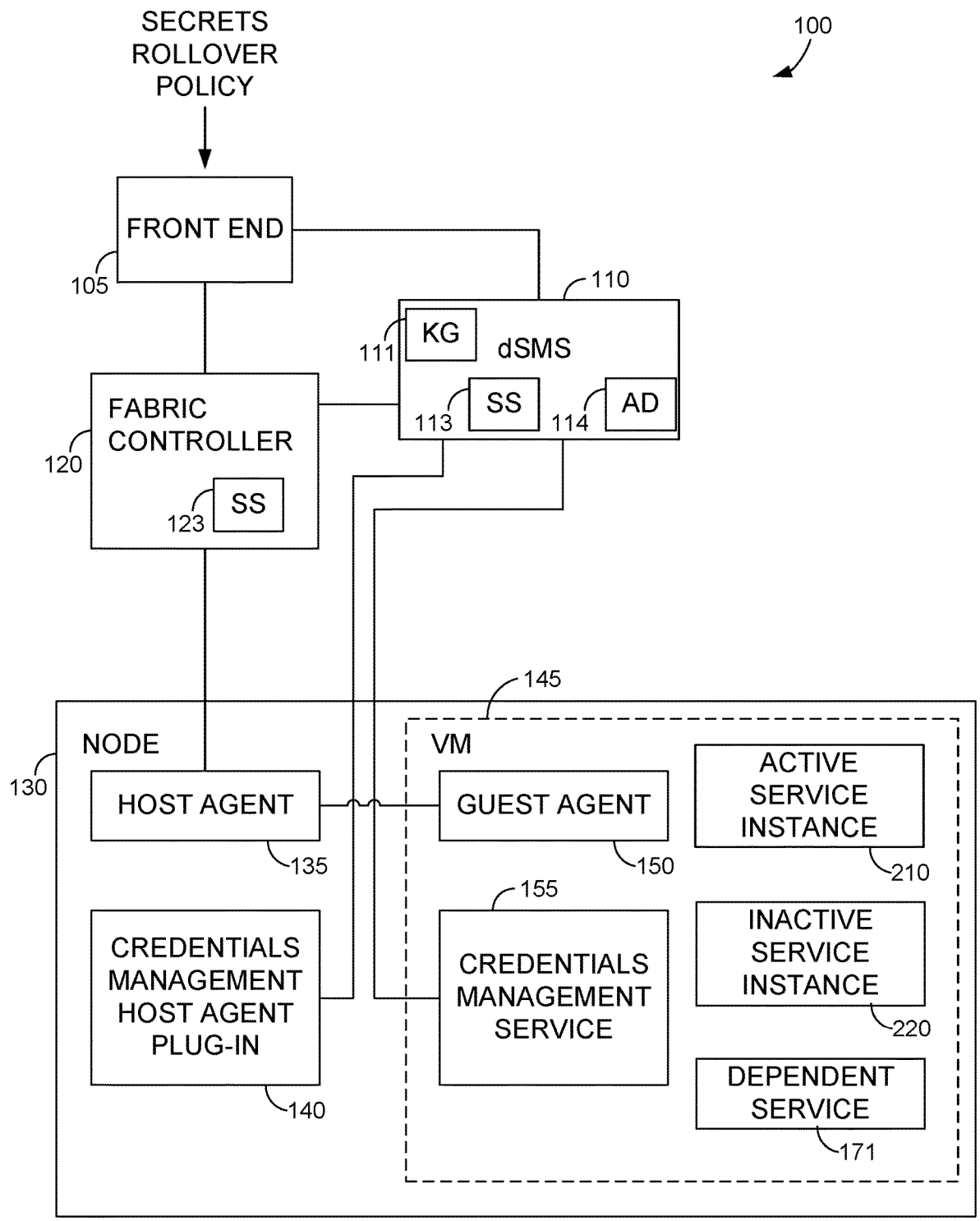
FIG. 1 is a block diagram of an example operating environment suitable for implementations of the present disclosure.

The various technologies described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects described herein provide simple and efficient methods and systems for implementing secrets renewal and distribution. Current methods of secret renewal often require the service to be shut down when a secret is retired and replaced. In one aspect, the shutdown of the service is required because the computing environment only allows secrets to be installed upon startup of the service. In other words, a hot swap of an existing secret with a new secret is not possible in some environments. The technology described herein allows a secret to be replaced in such an environment without disrupting the service during the rotation.

The service disruption currently caused by the need to shut down a service to install a new secret causes administrators to rotate secrets less frequently than best security practices recommend. Thus, the technology described herein improves security by allowing secret rotations to be performed more frequently, while maintaining high service availability. When a cryptographic epoch ends, typically an application is taken off-line while the application is re-tooled with new cryptographic secrets. Down-time experienced due to renewing cryptographic secrets results in poor availability. In order to maximize availability under typical designs, the cryptographic period is extended, and systems become more vulnerable due to those longer cryptographic periods.

Some applications even avoid defining a regular cryptographic maintenance period, in the interest of improved availability and so make a system vulnerable to attack.

The present technology provides a method to regenerate secrets while a version of the system is operational, thus avoiding the loss of availability that would have resulted from a system shutdown. The proposed solution reduces downtime that can result from current methods of secret rotation, which require the service to be shut down during secret rotation. The proposed technology provides a more secure system, with shorter cryptographic epochs, while achieving greater availability. Thus, in the event of a compromised system, the exposure time before the cryptographic secrets are replaces is shorter, and the system is more secure, and less vulnerable to attack.

The technology described herein may work in a computing context where a service has an active secret and a backup secret. The technology described avoids disruption of the service by activating a second instance of the service. The second instance is set up to be authenticated by the secret that is not being regenerated and to use only that secret without a second key as a backup. The second instance may be initially set up in a staging mode of the cloud service. Once the second instance is initiated and not associated with the secret to be generated as either an active or backup secret, then it transitioned from the staging to production mode where it is able to provide the service in the cloud environment. The original instance of the service, which is still associated with the key to be regenerated, is transitioned to a staging mode.

The key is then regenerated while the original instance is in staging mode. During the rotation process, the second instance is providing the service in the cloud environment. This allows an instance of the service to provide the service while the secret is rotated. A new secret is generated to replace the secret being rotated. The new secret is then assigned to the first instance of the service while it runs in the staging mode. Once the secret rotation is complete, the primary service instance is then moved back to the production mode with the new key configuration. The second instance is returned to the staging mode. The secrets may then be rotated for the second instances of the service.

Aspects described herein provide simple and efficient methods and systems for implementing secrets renewal and distribution. Generally, a secrets management service that stores secrets, such as certificates (e.g., chained, self-signed, imported, etc.), storage account keys, shared access signatures ("SAS"), connection strings, custom types, and the like, can be deployed. In the context of distributed computing, a datacenter secrets management service ("dSMS") can be deployed to orchestrate secrets renewal and rollover within the distributed computing environment. A customer can define a secrets rollover policy for a particular distributed computing service to enable the service to create secrets in dSMS and reference the secrets in a corresponding service model by path in dSMS. The secrets required by the service are deployed to corresponding VMs and/or nodes by the distributed computing platform (e.g., computing fabric). dSMS can monitor the expiration of secrets and automatically renew secrets according to the defined rollover policy. Additionally and/or alternatively to auto-renewal, dSMS can renew a secret in response to a request for an on-demand rollover (e.g., during a breach scenario). VMs and/or nodes can run an agent that periodically polls dSMS to check if any of the secrets installed on the VMs and/or nodes have been renewed in dSMS. If a secret has been renewed, the renewed secret can be provided by dSMS and installed locally on the corresponding VMs and/or nodes. For some secrets, such as server SSL/TLS certificates, new versions can be linked to a previous version such that subsequent requests to the endpoint (container, app, node, etc.) automatically use the new certificates.

A secrets management service, such as dSMS, can be utilized in other scenarios besides a distributed computing environment. For example, dSMS can be utilized to autonomously rollover client certificates for authentication of users who access a security critical service ("service app"). A client app can be onboarded into dSMS so required certificates can be deployed into the client app. The client app and/or service app can fetch renewed certificates using the polling technique described above. For example, a private key for a client certificate may be provided to the client app via a trusted endpoint of dSMS, while a public key may be provided to the service app in response to an anonymous call to a public endpoint of dSMS.

In some aspects, a secrets management service, such as dSMS, can be utilized to autonomously rollover storage-account keys. Generally, primary and secondary keys for a storage account are rolled over on a predefined schedule in an interleaving fashion. More specifically, the expiration of the primary key is separate from the expiration of the secondary key, and a customer can specify the renewal period in dSMS. In an example in which keys have a two-year expiration, every year, either the primary or the secondary key is renewed and distributed. Any shared access signatures ("SASes") which depend upon a storage account key can be generated and/or rolled over based on the expirations of the storage account keys. For example, dSMS can generate an SAS using the key that has farther expiration (i.e. the key that is valid for the longer time).

In some aspects, a secrets management service, such as dSMS, can be utilized to autonomously rollover secrets for services sharing secrets with other services across regional or other scope boundaries. Generally, a cross-scope secrets management service can be utilized to renew and distribute secrets across scope boundaries. The cross-scope secrets management service can be deployed with a replication scope (e.g., global, specific region, etc.) with which secrets are shared. Locally scoped (e.g., regional) secrets management services can subscribe to receive updates from the cross-scope secrets management service. As secrets are renewed, they are automatically propagated to the subscribing local scope and distributed by the local secrets management service.

Having briefly described an overview of aspects of the technology described herein, an exemplary operating environment in which aspects of the technology described herein may be implemented is described below in order to provide a general context for various aspects.

Datacenter Secrets Management Service (dSMS)

With reference to FIG. 1, aspects of the present disclosure can be implemented in a distributed computing environment (e.g., example distributed computing environment 1100 in FIG. 11) which facilitates autonomous secrets renewal and/or distribution. In the aspect illustrated in FIG. 1, secrets management system 100 includes front end 105, data center secrets management service ("dSMS") 110, fabric controller 120, and node 130 with virtual machine ("VM") 145. Node 130 includes host agent 135 and credentials management host agent plug-in 140, and VM 145 includes guest agent 150 and credentials management service 155. In aspects, the host agent 135 is generally an application that is responsible for monitoring the health of a physical machine, starting virtual machines and reporting physical machine health to the fabric controller. In aspects, the guest agent 150 monitors the health of the virtual machine, restarts roles that terminate, and keep the host agent informed about the status of the virtual machine. Some of the components of autonomous secrets management system 100 can correspond to components in example distributed computing environment 1100 in FIG. 11. Likewise, autonomous secrets management system 100, or aspects thereof, may be implemented using one or more computing devices such as computing device 1200 of FIG. 12. The components of autonomous secrets management system 100 may communicate with each other via a network, which may include, without limitation, one or more local area networks (LANs) and/or wide area networks (WANs). Such networking environments are commonplace in offices, enterprise-wide computer networks, intranets, and the Internet.

Generally, a client may configure a service model via front end 105 to deploy a desired service. Front end 105 operates as a service end point for the distributed computing environment. Previously, the client could define secrets to be used by the service, and the service model (e.g., a configuration file of the model) was generated that referenced a particular version of a secret (e.g., a certificate thumbprint). Once a service instance was deployed (e.g., the service model was distributed), the service was pinned to the particular version of the secret manually specified in the service model. If the secret was expired or revoked, the client had to manually renew the secret, provide the renewed secret, update the configuration model, and redeploy each service that relied on the secret (issuing new deployments to push them all down). Such conventional techniques required significant human intervention and possible downtime for the service.

In the aspect illustrated in FIG. 1, a client can configure a particular distributed computing service via front end 105. The configuration can include specifying secrets and a secrets rollover policy (e.g., timing for renewals, dependent services, timing for distribution of renewed secrets, staging, cross-scope applicability, etc.). A service model and/or configuration file can be generated referencing secrets by the path (e.g., absolute, relative, etc.) at which they are stored. For example, dSMS 110 can store secrets in secrets store ("SS") 113, so the referenced secrets path can be the directory of secrets store 113. dSMS 110 may be implemented using Representation State Transfer ("REST") communications protocol to facilitate inferring the directory of the secrets store from the system architecture. For example, in aspects with one dSMS per region (e.g., US West), the US West secrets store can be assigned as the secrets store for tenants with a home location in US West. By implementing REST, the absolute path of a secret need not be specified in a service model and/or configuration file because it can be inferred based on the tenant's home location. As such, implementing REST can simplify system communications. Other variations and combinations of representations of the path are contemplated with aspects described herein.

Generally, dSMS 110 is a secrets management service that can be deployed in a distributed computing environment and that generally orchestrates the secrets rollover. As used herein, secrets rollover comprises secrets renewal and distribution. Generally, a secret may be initially provided to dSMS 110, which installs and initially deploys the secret. As used herein, installing a secret refers to storing or otherwise making the secret accessible to support authentication operations. For example, dSMS 110 may store secrets in secrets store 113, including certificates (e.g., chained, self-signed, imported, etc.), storage account keys, shared access signatures ("SAS"), connection strings, custom types, and/or the like. Generally, secrets are associated with a service resource (e.g., a particular storage blob, service principal object, connection string, etc.). Additionally and/or alternatively, secrets can be associated with a deployment identification (e.g., <Fabric DNS, Tenant Name> tuple). In some aspects, dSMS 110 pushes secrets to fabric controller 120, which caches them in secrets store 123. During an initial deployment, fabric controller 120 can deploy the specified secrets to corresponding VMs and/or nodes (e.g., to start an instance of a service). When a secret managed by dSMS 110 is up for renewal (e.g., based on the specified renewal policy, based on a requested on-demand rollover, etc.), dSMS 110 can renew the secret (e.g., by issuing a new version of the secret, such as a self-signed certificate, by requesting a new version of the secret from an external authority, by requesting or otherwise accessing a new version of a secret, etc.) using the methods described herein. Renewed secrets are stored at the designated path for each secret, pushed to fabric controller 120 for caching in secrets store 123, and fetched by corresponding VMs and/or nodes. In this manner, dSMS 110 facilitates a fully autonomous secrets rollover.

During deployment, dSMS 110 contacts fabric controller 120 and pushes the secrets referenced in a corresponding service object to secrets store 123. During a secret rollover, dSMS 110 can refer to a service object to lookup and/or update the internal state of fabric controller 120 to reflect whether the renewed secret has been pushed to fabric and/or confirmed. In some aspects, fabric controller 120 can poll dSMS 110 for updates and provide an indication of its internal state. If dSMS 110 recognizes an internal state that is different from the state recorded in a corresponding service object, dSMS 110 can respond with updates.

Returning now to secrets management system 100, the components of autonomous secrets management system 100 may be configured to facilitate any or all of the techniques described herein.

On the node side, when an agent of node 130 (e.g., host agent 135, guest agent 150, etc.) receives managed secrets, it can install the secrets on a corresponding secrets store (optionally subject to staging, as discussed in more detail below). A credentials management component (e.g., credentials management host agent plug-in 140, credentials management service 155, etc.) can coordinate updates on node 130. For example, the credentials management component can periodically poll dSMS 110 using a defined polling interval (e.g., once a day) for updates. The poll can include metadata identifying the deployment and/or the current version of the secrets on node 130. In the event renewed secrets are available, dSMS 110 replies with the renewed secrets, and the credentials management component installs them.

Figure 2:
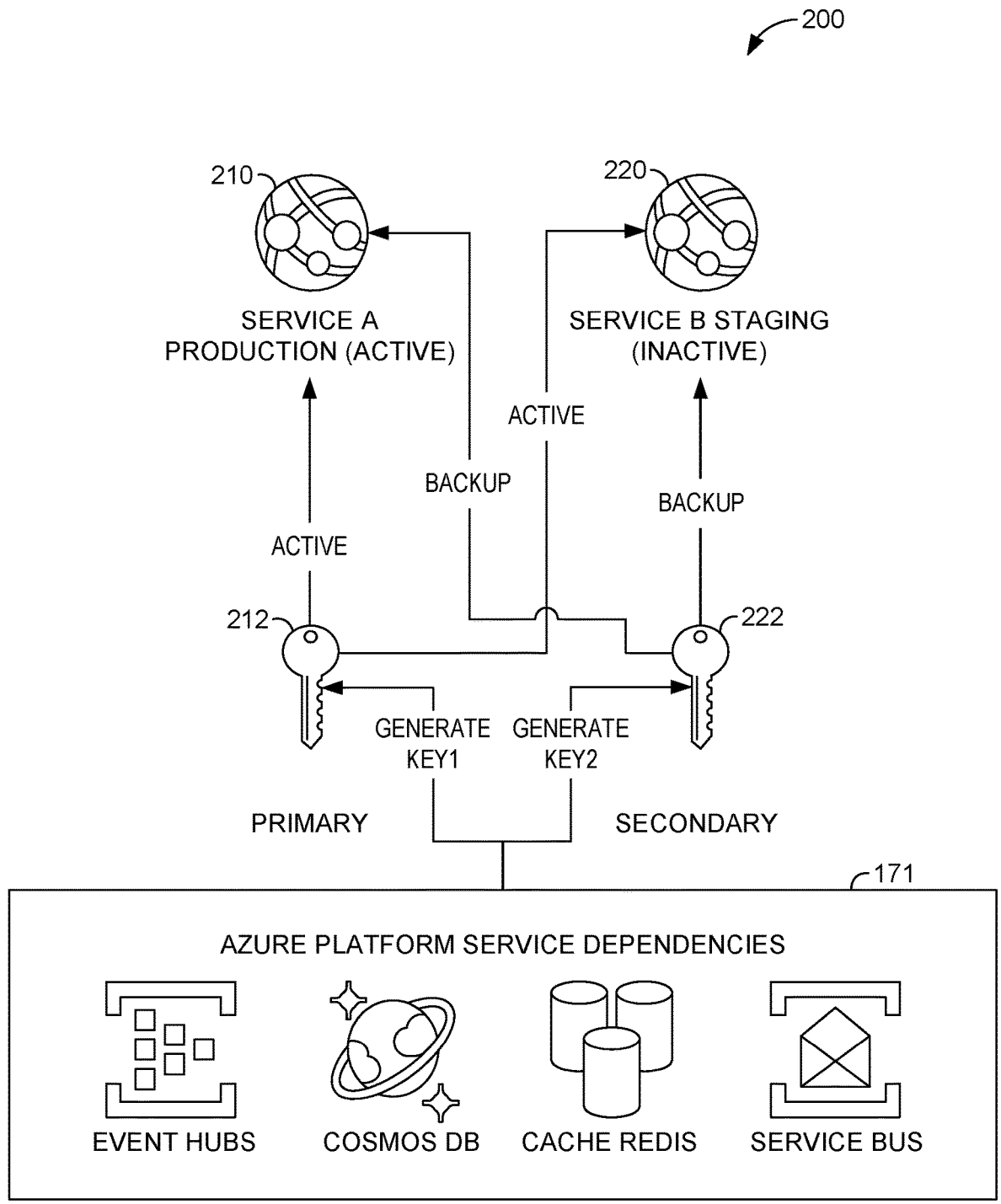
FIG. 2 is a diagram depicting an example application service system environment for implementing aspects of the present disclosure.

Referring now to FIG. 2, a block diagram is provided showing application-service environment system 200. For example, system 200 may be a cloud service environment hosting a production dependent application service instance 210, and a staging dependent application service 220. When an active application service 210 attempts to access a cloud platform dependent service such as Event hubs, cosmos dB, Cache Redis, or service Bus, the app service instance 210 authenticates itself for access to the service using an active key such as key 212. For example, if App service instance 210 accesses cosmos dB to obtain results for a data query, Cosmos dB authenticates App service instance 210 as the principal identity who has access to the database accessed, using the privileges of cosmos dB access. Typically, a cloud dependency such as cosmos dB receives a key 212 with an identifier for an App service instance 210. Cosmos dB then accesses a cloud authentication service to verify that key 212 is the secret, which grants access to the identifier received. System 200 supports use of a secondary identifier key 222, which may also be used as an authentication secret that grants an app service instance 210 access to a service dependency such as cosmos dB. A dependency, such as Cosmos dB, is able to authenticate a service request from an app service instance 210, if the app service instance 210 provides an identifier along with either key 212 for authentication or key 222 for authentication with the service request.

Figure 6:
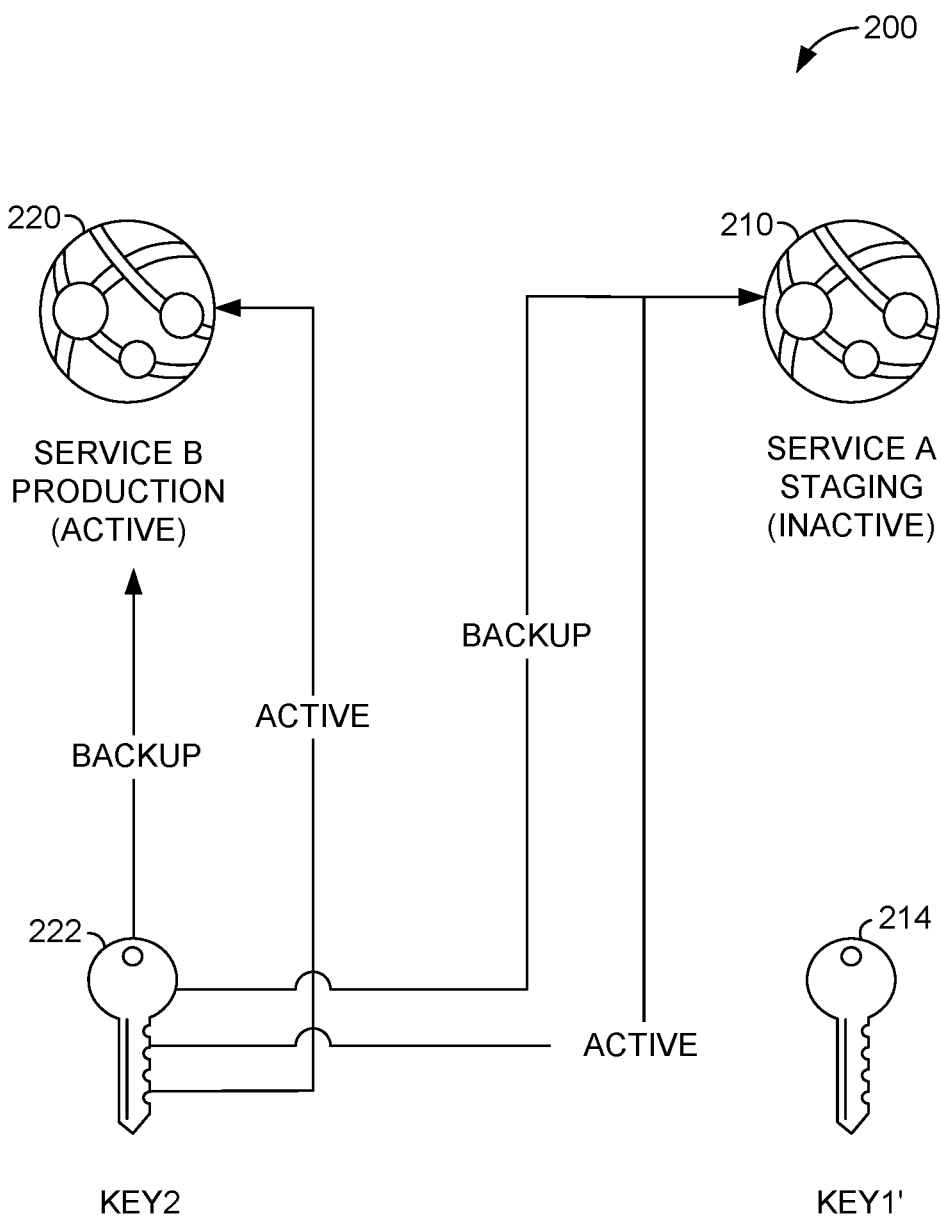
FIG. 6 is a diagram showing application and key associations after regenerating a first key, in accordance with an aspect of the technology described herein.

System 200 typically provides a first secret generator operable to generate a key 212. In an aspect, a key 212 is an initial key in a key sequence. Upon a regeneration command, a secret generator generates a succeeding secret, such as key 214, as shown in FIG. 6. In an aspect the key 212 is a symmetric key and a generate key 1 function performs a symmetric key generation function, producing a long sequence of symmetric keys. Likewise key 222 is a symmetric key, and a generate key 2 function performs a symmetric key generation function, producing an initial key 222 in a different long sequence of symmetric keys. A regenerate key 2 function applied to the second key results in a succeeding key in the second key sequence.

System 200 typically has two reference instances representing an application service: a production service mode holds an active production version of an application service, such as app service instance 210. A second staging mode holds a second application service instance in app service instance 220 that is inactive. In some cases, a staging mode is occupied by a previous version of an application service. In such a case, an app service instance 220 is the prior, stable version of an application service. When a bug is encountered in a production version, such as application service instance 210, an On Call Engineer (OCE) will switch a staging mode to a production mode so that the older version of a service is activated. A prior production deployment may then be disabled while a defect in the code of the production version can be fixed. Such a case has advantages of providing reliability and graceful repair when a new bug defect is encountered.

Exemplary system 200 shows a cloud system that generates an initial first secret key 212 as an active secret that authenticates app service instance 210 as a dependent service operating in a cloud environment. Likewise, the cloud system generates an initial second secret key 222 that serves as a backup authentication secret for app service instance 210. Additionally, system 200 defines initial first secret key 212 as the active secret for app service instance 220, and initial second secret key 222 as a backup authentication secret for app service instance 220.

A system 200 may have a defined secret epoch, which means that a secret must be regenerated when a prior epoch ends. In some instances, a secret epoch is pre-planned, defined to be a time interval such as a week, a month, three months, six months or a year. In some instance, an event abruptly indicates a need to bring the prior epoch to a close. For example, a company has layoffs, and some nefarious employees may take the secrets from the prior epoch and wreak havoc on the system until the secrets are changed. As another example, a data exposure exposes code that includes secrets from a current epoch. An OCE elects to bring the current epoch to a close as a precaution. As another example, an alert indicates the system, or a related system may have been exposed, or has exceeded the maximum time of an epoch, or that there has been a recent cyber-attack. As an additional example, a user input indicates a desire to regenerate a key for an active instance on-demand for any reason deemed helpful by the user. Under such a scenario, there is no defect in the production version of the service instance 210, but there is a need to gracefully regenerate the secret or secrets used while minimizing down-time and maximizing service availability while also providing good security for questionable secrets.

A system 200 receives a request to replace the active secret for a service instance 210. System 200 makes a copy of the app service instance 210 and provides the copy as app service instance 220. Thus, the production-mode service code is copied to the staging mode. In an aspect, this copy function can be the copy of a reference pointer, which refers to another instance in memory of the same data. In an aspect, the copying function can be the copy of a reference that has the effect of pulling another copy of an instance into memory. In an aspect, a copy of the active instance is moved into a staging mode. In an aspect, this copy function can be the copy of a reference pointer, which refers to another instance in memory of the same data. Thus, the production mode service code is copied to the staging mode.

Figure 3:
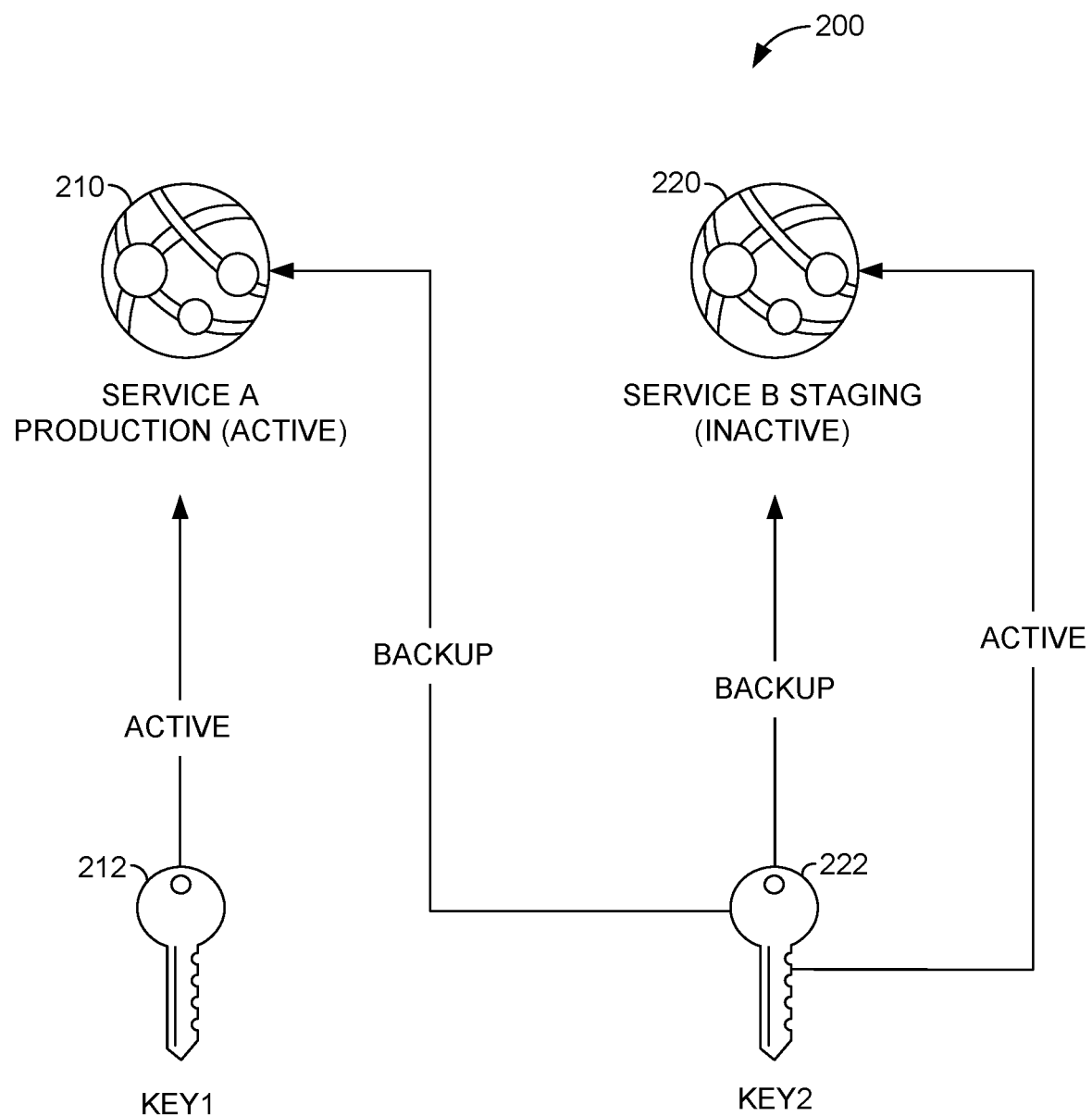
FIG. 3 is a diagram showing application and key associations for designating a second secret as the only active secret for a second instance of a service, in accordance with an aspect of the technology described herein.

Turning now to FIG. 3 a diagram shows application and key associations for designating a second secret as the only active secret for a second instance of a service. The active key for app service instance 220 is defined to be key 222. In an aspect, the staging mode service is restarted to reset the service runtime.

Figure 4:
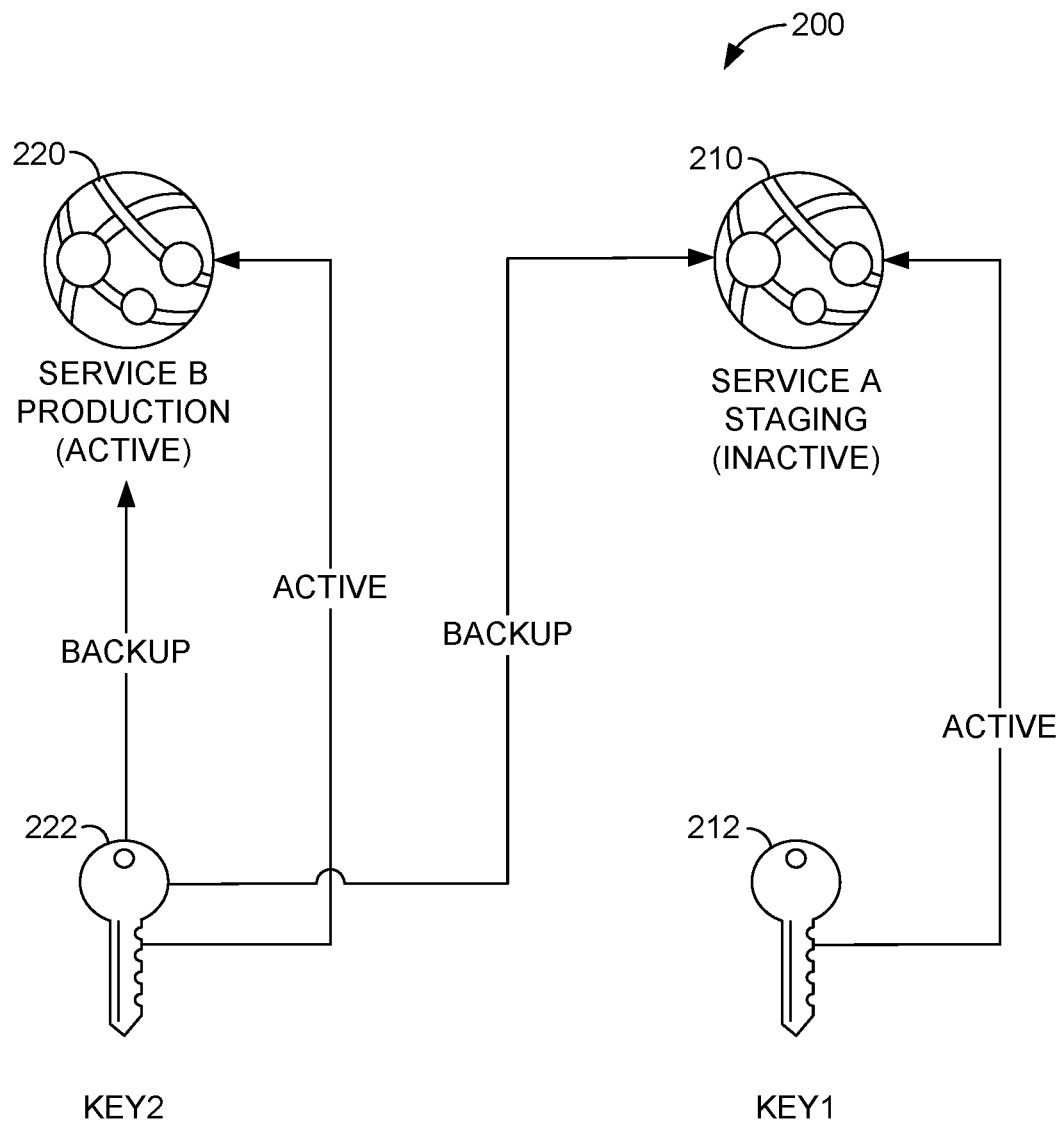
FIG. 4 is a diagram showing application and key associations for moving an instance of an application from one kind of mode to another kind of mode, in accordance with an aspect of the technology described herein.

Turning now to FIG. 4, a diagram shows application and key associations for moving an instance in one kind of mode to another kind of mode. In an aspect, a swap command swaps the production mode for the staging mode, so that the app service instance 220 is moved to the production mode, and the app service instance 210 is moved to the staging mode. In an aspect, a swap function swaps the pointers to the two instances. In an aspect, a swap function is provided by system 200. In an aspect, system 200 provides an instance move function, which moves an instance from a production mode to a temporary memory area; another instance move function moves the staged instance into the production mode; and another instance move function moves the temporary memory area into the staged mode.

Figure 5:
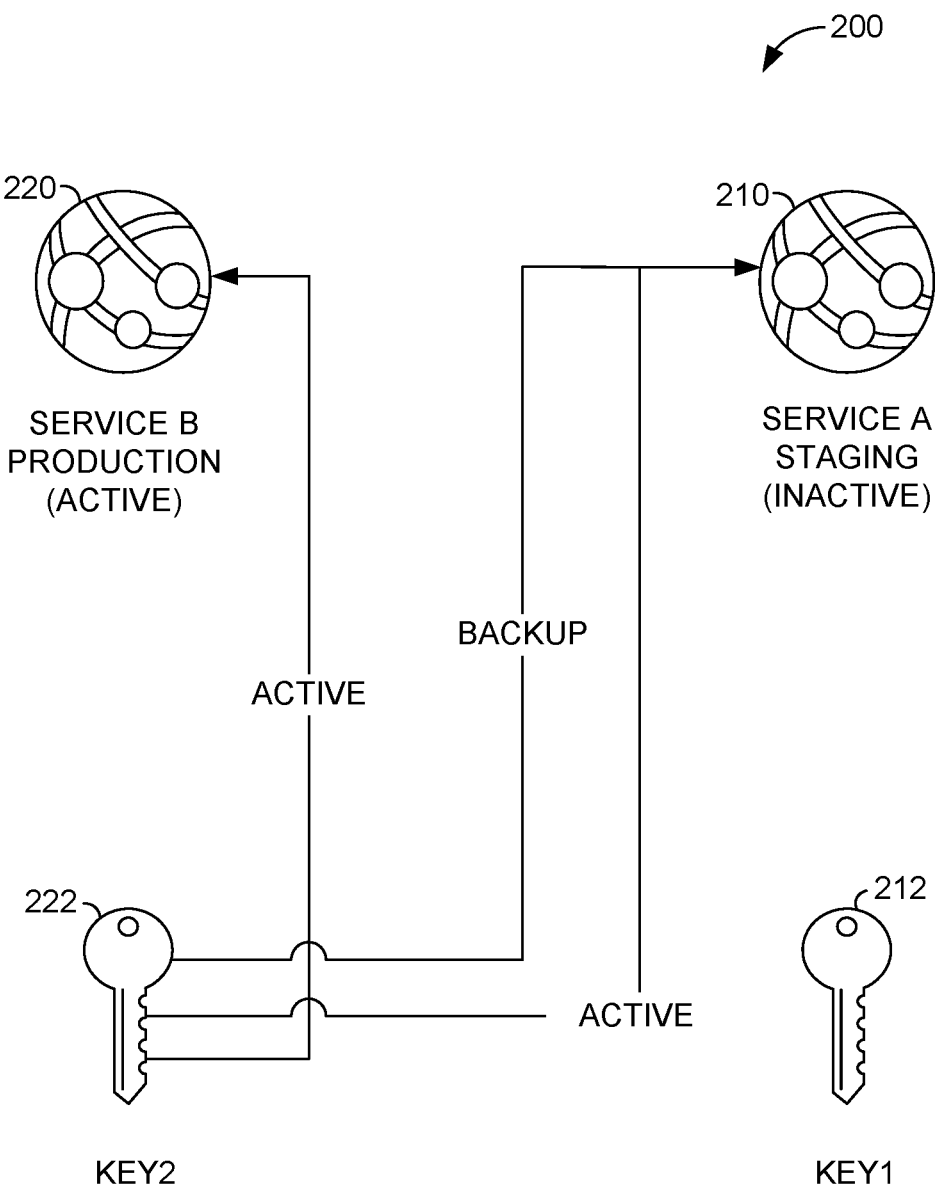
FIG. 5 is a diagram showing application and key associations in preparation for regenerating a first key, in accordance with an aspect of the technology described herein.

Turning now to FIG. 5, there is shown therein a diagram showing application and key associations in preparation for regenerating a first key. System 200 makes key 222 the active key for the app service instance 210. In an aspect, the staging mode service is restarted to reset the service runtime. The resulting state of the system is that secret key 212 has no active or backup assignments for either app service instance 220 or for app service instance 210. The first key is then regenerated to form a new first secret as shown in key 214 in FIG. 6.

Figure 7:
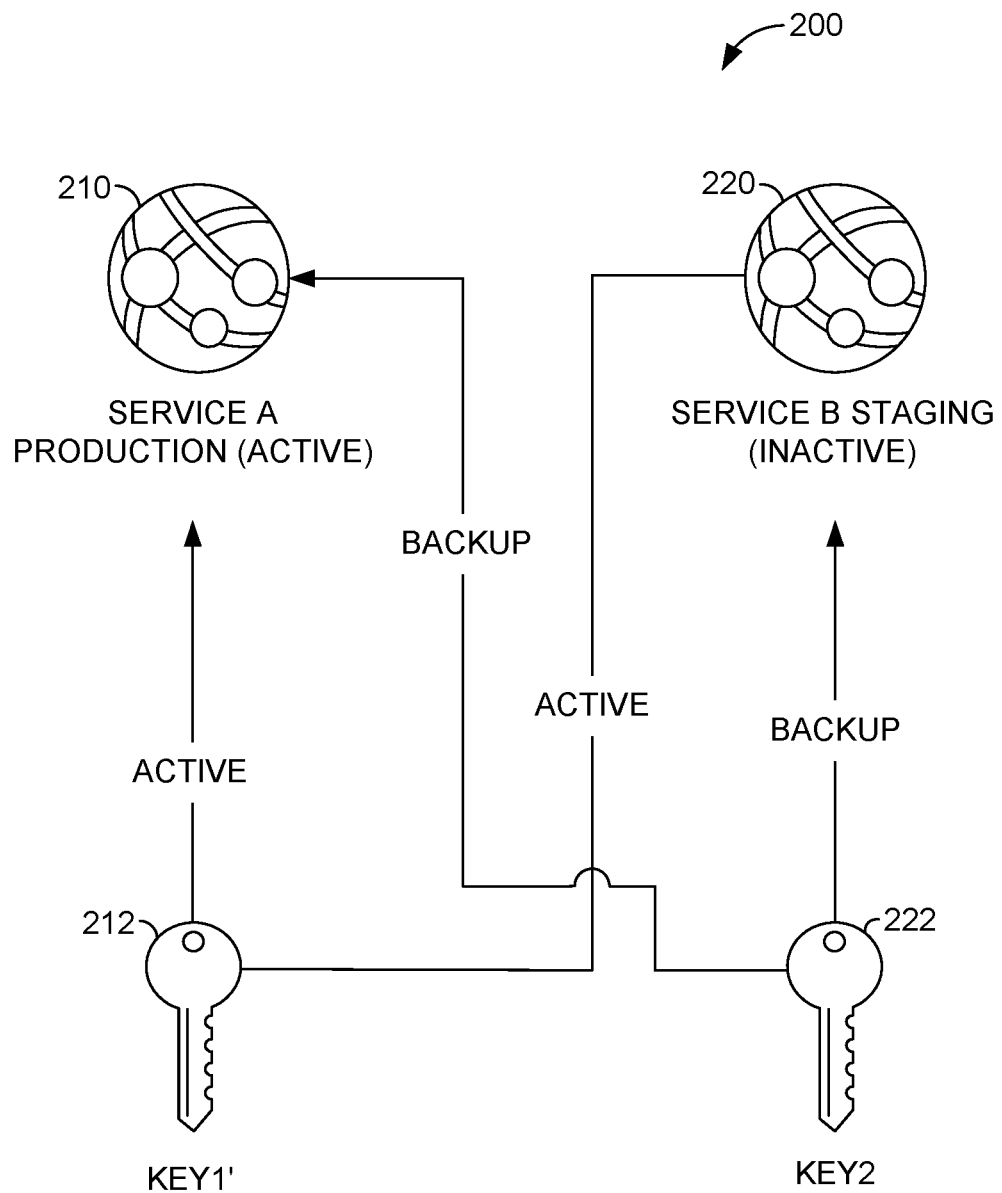
FIG. 7 is a diagram showing application and key associations after restoring active and backup keys for an instance, in accordance with an aspect of the technology described herein.

Turning now to FIG. 7, there is a diagram showing application and key associations after restoring active and backup keys for an instance. Key 214 is made the active key for app service instance 220. Key 214 is made the active key for app service instance 210.

Exemplary Methods

Now referring to FIGS. 8, each block of method 800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, method 800 is described, by way of example, with respect to FIGS. 1-7. However, these methods may additionally or alternatively be executed by any one system, or any combination of systems, including, but not limited to, those described herein.

FIG. 8 is a flow diagram showing a method 800 for rotation a secret for a cloud service, in accordance with some aspects of the present disclosure. Method 800 could be performed on or with systems similar to those described with reference to FIGS. 1-7.

The method 800, at block 802 includes initiating a secret rotation process for a first secret that is in an active secret role for both a first instance of a service and a second instance of the service. As mentioned, the secret rotation could be initiated based on the upcoming expiration of a secret that needs rotated. For example, a rotation may be initiated when the secret is within a month, or some other threshold time, from expiration. The determining may be based on receiving a notification from a system that monitors the secret expiration and implements a rotation policy. The monitoring and rotation service may be integrated in the same system, in which case, the rotation system tracks the secret expiration date and initiates the rotation when the threshold time period in a rotation policy is reached. The secret rotation could also be initiated in response to an indication it has been compromised in some way. In this case, the determining may be in response to a notification received from a security service. A user may also manually initiate a rotation, which constitutes determining that a secret rotation is to be initiated when such as notification is received.

The method 800, at block 804 includes assigning a second secret to the active secret role for a second instance of the service. The first and second instances provide the same service. Both the first and second secret is capable of authenticating the service within the cloud environment. The secret in the active role is provided during authentication. The secret in the backup role may be used as an alternative. The reassigning may be completed by updating secret fields associated with the application instance. A secret may be identified using a unique identification code. The code identifying the second secret could be inserted into the application field identifying the active secret. Similarly, the code identifying the second secret could also be inserted into the application field identifying the backup secret. This change may be made through an application program interface (API) that enables these changes.

The method 800, at block 806 includes, after assigning the second secret to the active secret role for the second instance, initiating a first transition of the first instance from a production mode to a staging mode of a cloud environment and the second instance from the staging mode to the production mode of the cloud environment. When in production mode, the service is available to the cloud environment. When in staging mode, the service instance is not available in the cloud environment. The transition can include changing the routing information for the respective service instances. Typically, applications requesting the service have a means of knowing the address or otherwise routing a request to the service, for example, through a command function. A dynamic routing function in front of (upstream in the communication path) may be updated to send the request to the service instance in the active mode, rather than the service in the staging mode. The transition may be transparent to the applications requesting the service provided by the first and second service instances. The requesting services may not need to update the command or address through which the service is requested.

The method 800, at block 808 includes, after completing the first transition, causing regeneration of the first secret to form a new first secret. The first instance may need to be restarted during the regeneration process. Other changes may need to be made throughout the cloud environment to allow the new first secret to perform an authentication of the service. Restarting the first instance would prevent the first instance from providing the service and the changes in the system might also prevent the first instance from providing the service until all updates are made. However, because the first instance is in the staging slot, the first instance will not receive requests for the service during the regeneration process. The second instance will be able to provide the service using the second secret serving in the active role and the backup role. So long as the secret in the backup role does not fail during the regeneration process of the first secret, the service will remain available throughout the regeneration of the first secret. If the first instance was not first moved to the staging mode, then the service would not be available during portions of the regeneration.

The method 800, at block 810 includes assigning the new first secret to the active secret role for the first instance of the service. As mentioned, a field defining the active secret can be updated to include an identification of the new first secret.

The method 800, at block 812 includes, after the new first secret is in the active secret role for the first instance, initiating a second transition of the first instance from the staging mode to the production mode and the second instance from the production mode to the staging mode of the cloud environment. This completes the rotation of the first secret with the service. The first instance of the service is now available to provide the service in the cloud environment using the new first secret as the active secret. The new secret could be made the active secret for the second instance of the service now operating in the staging mode. The second secret could then be the in the backup role for both the first instance and second instance of the service. Other steps may be taken throughout the cloud environment to enable use of the new first secret. The process could be repeated to rotate the second secret.

Figure 9:
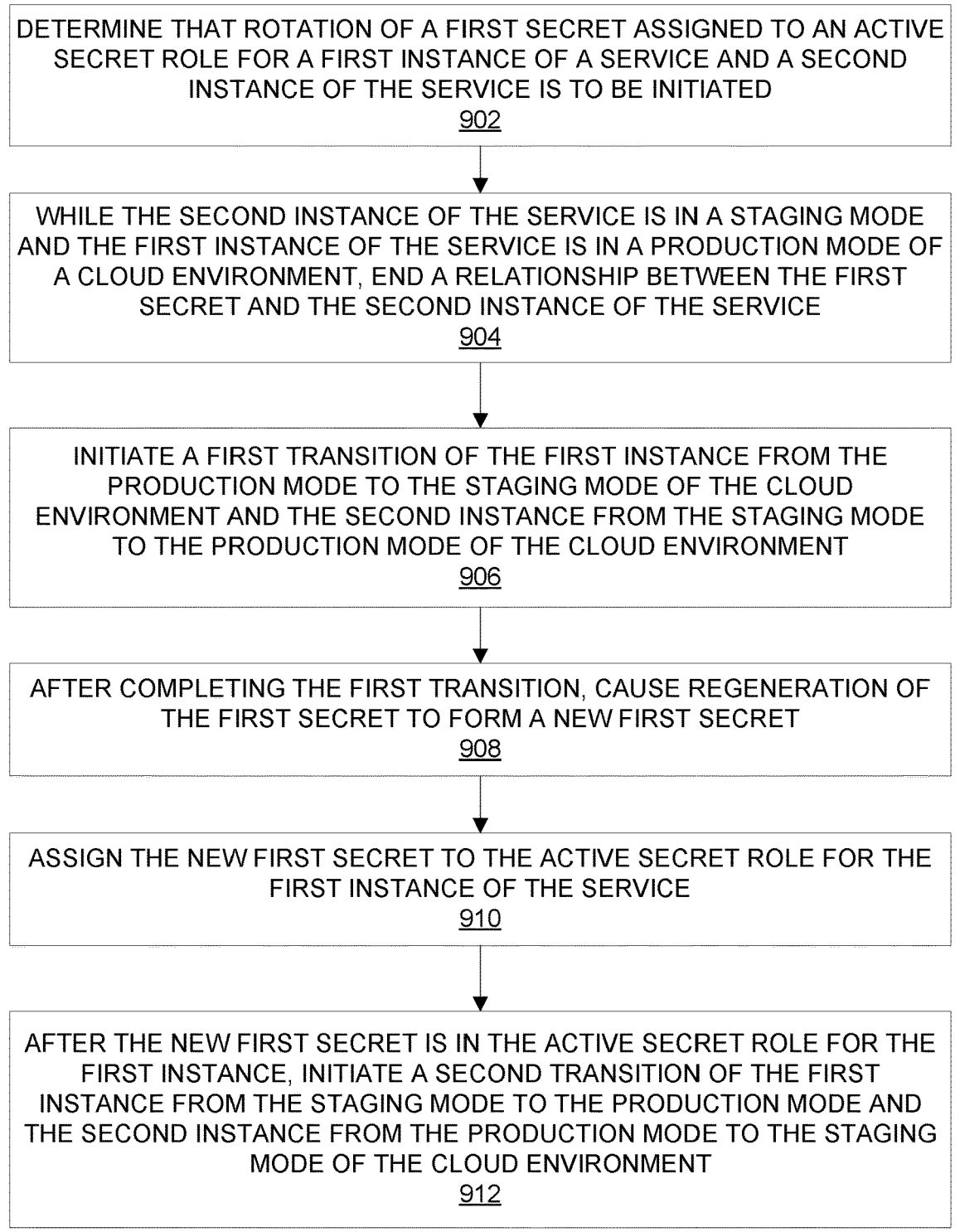
FIG. 9 is a flow diagram showing a method of secret rotation, in accordance with an aspect of the technology described herein.

Now referring to FIGS. 9, each block of method 900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, method 900 is described, by way of example, with respect to FIGS. 1-7. However, these methods may additionally or alternatively be executed by any one system, or any combination of systems, including, but not limited to, those described herein.

The method 900, at block 902 includes initiating rotation of a first secret assigned to an active secret role for a first instance of a service and a second instance of the service. As mentioned, the secret rotation could be initiated based on the upcoming expiration of a secret that needs rotated. For example, a rotation may be initiated when the secret is within a month, or some other threshold time, from expiration. The determining may be based on receiving a notification from a system that monitors the secret expiration and implements a rotation policy. The monitoring and rotation service may be integrated in the same system, in which case, the rotation system tracks the secret expiration date and initiates the rotation when the threshold time period in a rotation policy is reached. The secret rotation could also be initiated in response to an indication it has been compromised in some way. In this case, the determining may be in response to a notification received from a security service. A user may also manually initiate a rotation, which constitutes determining that a secret rotation is to be initiated when such as notification is received.

The method 900, at block 904 includes, while the second instance of the service is in a staging mode and the first instance of the service is in a production mode of a cloud environment, ending a relationship between the first secret and the second instance of the service.

The method 900, at block 906 includes initiating a first transition of the first instance from the production mode to the staging mode of the cloud environment and the second instance from the staging mode to the production mode of the cloud environment. When in production mode, the service is available to the cloud environment. When in staging mode, the service instance is not available in the cloud environment. The transition can include changing the routing information for the respective service instances. Typically, applications requesting the service have a means of knowing the address or otherwise routing a request to the service, for example, through a command function. A dynamic routing function in front of (upstream in the communication path) may be updated to send the request to the service instance in the active mode, rather than the service in the staging mode. The transition may be transparent to the applications requesting the service provided by the first and second service instances. The requesting services may not need to update the command or address through which the service is requested.

The method 900, at block 908 includes after completing the first transition, causing regeneration of the first secret to form a new first secret. The first instance may need to be restarted during the regeneration process. Other changes may need to be made throughout the cloud environment to allow the new first secret to perform an authentication of the service. Restarting the first instance would prevent the first instance from providing the service and the changes in the system might also prevent the first instance from providing the service until all updates are made. However, because the first instance is in the staging slot, the first instance will not receive requests for the service during the regeneration process. The second instance will be able to provide the service using the second secret serving in the active role and the backup role. So long as the secret in the backup role does not fail during the regeneration process of the first secret, the service will remain available throughout the regeneration of the first secret. If the first instance was not first moved to the staging mode, then the service would not be available during portions of the regeneration.

The method 900, at block 910 includes assigning the new first secret to the active secret role for the first instance of the service. As mentioned, a field defining the active secret can be updated to include an identification of the new first secret.

The method 900, at block 912 includes, after the new first secret is in the active secret role for the first instance, initiating a second transition of the first instance from the staging mode to the production mode and the second instance from the production mode to the staging mode of the cloud environment. This completes the rotation of the first secret with the service. The first instance of the service is now available to provide the service in the cloud environment using the new first secret as the active secret. The new secret could be made the active secret for the second instance of the service now operating in the staging mode. The second secret could then be the in the backup role for both the first instance and second instance of the service. Other steps may be taken throughout the cloud environment to enable use of the new first secret. The process could be repeated to rotate the second secret.

Now referring to FIGS. 10, each block of method 1000, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, method 800 is described, by way of example, with respect to FIGS. 1-7. However, these methods may additionally or alternatively be executed by any one system, or any combination of systems, including, but not limited to, those described herein.

The method 1000, at block 1002 includes, while a second instance of a service is in a staging mode and a first instance of the service is in a production mode in a cloud environment, terminating a relationship between a first secret and the second instance of the service. When in production mode, the service is available to the cloud environment. When in staging mode, the service instance is not available in the cloud environment.

Terminating the relationship can include removing an identifier of the first secret from a security field that defines the active secret for the second instance. The identifier of the first secret may also be removed from the field that defines the backup secret, if the first secret is initially serving as the backup.

The method 1000, at block 1004 includes reassigning a second secret from a backup secret role to an active secret role for the second instance of the service. The reassigning may be completed by updating secret fields associated with the application instance. A secret may be identified using a unique identification code. The code identifying the second secret could be inserted into the application field identifying the active secret. Similarly, the code identifying the second secret could also be inserted into the application field identifying the backup secret. This change may be made through an application program interface (API) that enables these changes.

The method 1000, at block 1006 includes initiating a first transition of the first instance from the production mode to the staging mode of the cloud environment and the second instance from the staging mode to the production mode of the cloud environment. The transition can include changing the routing information for the respective service instances. Typically, applications requesting the service have a means of knowing the address or otherwise routing a request to the service, for example, through a command function. A dynamic routing function in front of (upstream in the communication path) may be updated to send the request to the service instance in the active mode, rather than the service in the staging mode. The transition may be transparent to the applications requesting the service provided by the first and second service instances. The requesting services may not need to update the command or address through which the service is requested.

The method 1000, at block 1008 includes after completing the first transition, causing regeneration of the first secret to form a new first secret. The first instance may need to be restarted during the regeneration process. Other changes may need to be made throughout the cloud environment to allow the new first secret to perform an authentication of the service. Restarting the first instance would prevent the first instance from providing the service and the changes in the system might also prevent the first instance from providing the service until all updates are made. However, because the first instance is in the staging slot, the first instance will not receive requests for the service during the regeneration process. The second instance will be able to provide the service using the second secret serving in the active role and the backup role. So long as the secret in the backup role does not fail during the regeneration process of the first secret, the service will remain available throughout the regeneration of the first secret. If the first instance was not first moved to the staging mode, then the service would not be available during portions of the regeneration.

The method 1000, at block 1010 includes assigning the new first secret to the active secret role for the first instance of the service. As mentioned, a field defining the active secret can be updated to include an identification of the new first secret.

The method 1000, at block 1012 includes after the new first secret is in the active secret role for the first instance, initiating a second transition of the first instance from the staging mode to the production mode and the second instance from the production mode to the staging mode of the cloud environment. This completes the rotation of the first secret with the service. The first instance of the service is now available to provide the service in the cloud environment using the new first secret as the active secret. The new secret could be made the active secret for the second instance of the service now operating in the staging mode. The second secret could then be the in the backup role for both the first instance and second instance of the service. Other steps may be taken throughout the cloud environment to enable use of the new first secret. The process could be repeated to rotate the second secret.

Example Distributed Computing Environment

Figure 11:
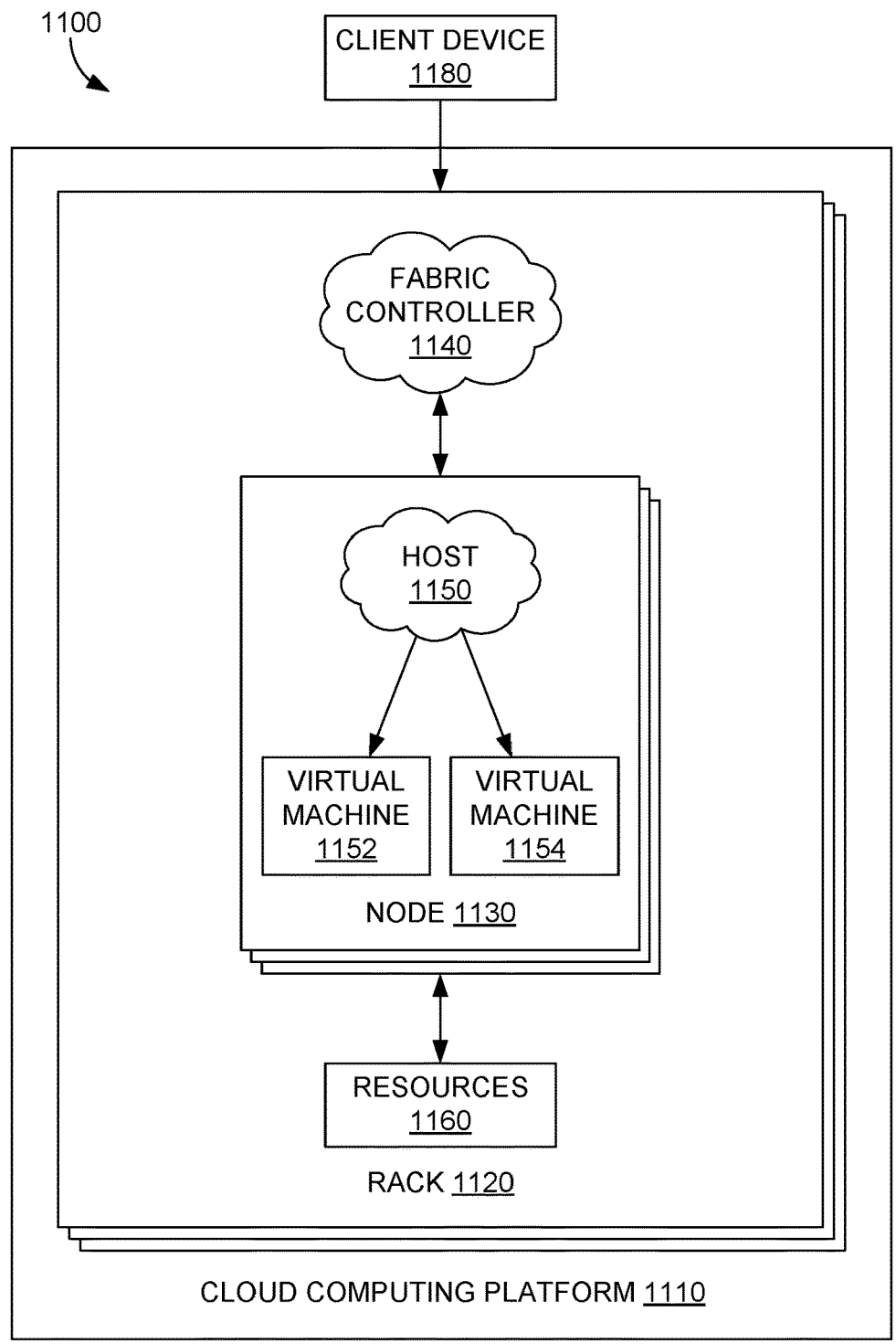
FIG. 11 is a block diagram of an exemplary cloud computing environment, in accordance with an aspect of the technology described herein.

Referring now to FIG. 11, FIG. 11 illustrates an example distributed computing environment 1100 in which implementations of the present disclosure may be employed. In particular, FIG. 11 shows a high-level architecture of the secrets management system ("system") in cloud computing platform 1110, where the system supports seamless modification of software component. It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions, etc.) can be used in addition to or instead of those shown.

Data centers can support distributed computing environment 1100 that includes cloud computing platform 1110, rack 1120, and node 1130 (e.g., computing devices, processing units, or blades) in rack 1120. The system can be implemented with cloud computing platform 1110 that runs cloud services across different data centers and geographic regions. Cloud computing platform 1110 can implement fabric controller 1140 component for provisioning and managing resource allocation, deployment, upgrade, and management of cloud services. Typically, cloud computing platform 1110 acts to store data or run service applications in a distributed manner. Cloud computing infrastructure 1110 in a data center can be configured to host and support operation of endpoints of a particular service application. Cloud computing infrastructure 1110 may be a public cloud, a private cloud, or a dedicated cloud.

Node 1130 can be provisioned with host 1150 (e.g., operating system or runtime environment) running a defined software stack on node 1130. Node 1130 can also be configured to perform specialized functionality (e.g., compute nodes or storage nodes) within cloud computing platform 1110. Node 1130 is allocated to run one or more portions of a service application of a tenant. A tenant can refer to a customer utilizing resources of cloud computing platform 1110. Service application components of cloud computing platform 1110 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1130, nodes 1130 may be partitioned into virtual machines (e.g., virtual machine 1152 and virtual machine 1154). Physical machines can also concurrently run separate service applications. The virtual machines or physical machines can be configured as individualized computing environments that are supported by resources 1160 (e.g., hardware resources and software resources) in cloud computing platform 1110. It is contemplated that resources can be configured for specific service applications. Further, each service application may be divided into functional portions such that each functional portion is able to run on a separate virtual machine. In cloud computing platform 1110, multiple servers may be used to run service applications and perform data storage operations in a cluster. In particular, the servers may perform data operations independently but exposed as a single device referred to as a cluster. Each server in the cluster can be implemented as a node.

Client device 1180 may be linked to a service application in cloud computing platform 1110. Client device 1180 may be any type of computing device, which may correspond to computing device 1100 described with reference to FIG. 11, for example. Client device 1180 can be configured to issue commands to cloud computing platform 1110. In aspects, client device 1180 may communicate with service applications through a virtual Internet Protocol (IP) and load balancer or other means that direct communication requests to designated endpoints in cloud computing platform 1110. The components of cloud computing platform 1110 may communicate with each other over a network (not shown), which may include, without limitation, one or more local area networks (LANs) and/or wide area networks (WANs).

Exemplary Operating Environment

Figure 12:
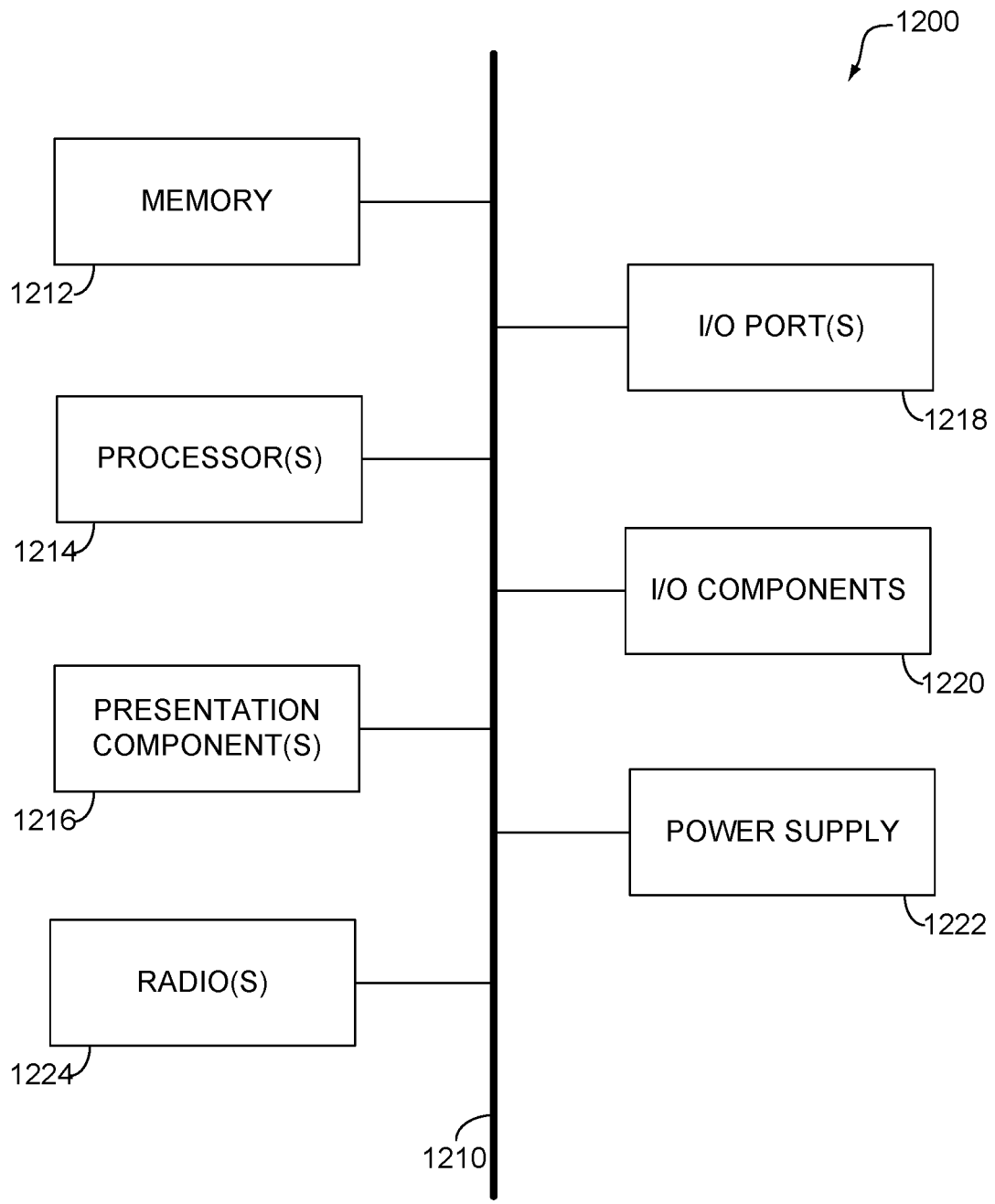
FIG. 12 is a block diagram of an exemplary computing environment suitable for use in implementing aspects of the technology described herein.

Referring to the drawings in general, and initially to FIG. 12 in particular, an exemplary operating environment for implementing aspects of the technology described herein is shown and designated generally as computing device 1200. Computing device 1200 is but one example of a suitable computing environment and is not intended to suggest any limitation as to the scope of use of the technology described herein. Neither should the computing device 1200 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 12, computing device 1200 includes a bus 1210 that directly or indirectly couples the following devices: memory 1212, one or more processors 1214, one or more presentation components 1216, input/output (I/O) ports 1218, I/O components 1220, and an illustrative power supply 1222. Bus 1210 represents what may be one or more busses (such as an address bus, data bus, or a combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 12 is merely illustrative of an exemplary computing device that may be used in connection with one or more aspects of the technology described herein. Distinction is not made between such categories as "workstation," "server," "laptop," "handheld device," etc., as all are contemplated within the scope of FIG. 12 and refer to "computer" or "computing device."

Computing device 1200 typically includes a variety of computer-readable media. Computer-readable media may be any available media that may be accessed by computing device 1200 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1212 includes computer storage media in the form of volatile and/or nonvolatile memory. The memory 1212 may be removable, non-removable, or a combination thereof. Exemplary memory includes solid-state memory, hard drives, optical-disc drives, etc. Computing device 1200 includes one or more processors 1214 that read data from various entities such as bus 1210, memory 1212, or I/O components 1220. Presentation component(s) 1216 present data indications to a user or other device. Exemplary presentation components 1216 include a display device, speaker, printing component, vibrating component, etc. I/O ports 1218 allow computing device 1200 to be logically coupled to other devices, including I/O components 1220, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1214 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1200. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as stereoscopic camera systems, infrared camera systems, RGB camera systems, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

A computing device may include a radio 1224. The radio 1224 transmits and receives radio communications. The computing device may be a wireless terminal adapted to receive communications and media over various wireless networks. Computing device 1200 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

Embodiments

Embodiment 1. One or more computer storage media comprising computer-executable instructions that when executed by a computing device cause the computing device to perform a method of rotating a secret without disrupting access to a service that is authenticated by the secret, the method comprising initiating a secret rotation process for a first secret that is in an active secret role for both a first instance of a service and a second instance of the service. The method further comprising assigning a second secret to the active secret role for a second instance of the service. The method further comprising, after assigning the second secret to the active secret role for the second instance, initiating a first transition of the first instance from a production mode to a staging mode of a cloud environment and the second instance from the staging mode to the production mode of the cloud environment. The method further comprising after completing the first transition, causing regeneration of the first secret to form a new first secret. The method further comprising assigning the new first secret to the active secret role for the first instance of the service. The method further comprising, after the new first secret is in the active secret role for the first instance, initiating a second transition of the first instance from the staging mode to the production mode and the second instance from the production mode to the staging mode of the cloud environment.

Embodiment 2. The media of embodiment 1, wherein, at the time when the determining that the secret rotation process is to be initiated occurs, the second instance of the service is operating in the staging mode of the cloud environment.

Embodiment 3. The media of embodiment 2, wherein, at the time when the determining that the secret rotation process is to be initiated occurs, the first secret is in the active secret role for the second instance of the service and the second secret is in a backup secret role for the second instance of the service.

Embodiment 4. The media of any of the above embodiments, wherein the method further comprises assigning the second secret to the active secret role for the first instance of the service after the first instance is in the staging mode.

Embodiment 5. The media of embodiment 4, wherein the method further comprises assigning the second key to a backup secret role for the first instance after the first instance is in the staging mode.

Embodiment 6. The media of any of the above embodiments, wherein assigning a new role to an existing secret does not require restarting a service instance.

Embodiment 7. The media of any of the above embodiments, wherein assigning the new first secret to the active secret role for the first instance of the service comprises restarting the first instance.

Embodiment 8. A method of rotating a secret without disrupting access to a service that is authenticated by the secret, the method comprising initiating rotation of a first secret assigned to an active secret role for a first instance of a service and a second instance of the service. The method further comprising, while the second instance of the service is in a staging mode and the first instance of the service is in a production mode of a cloud environment, ending a relationship between the first secret and the second instance of the service. The method further comprising initiating a first transition of the first instance from the production mode to the staging mode of the cloud environment and the second instance from the staging mode to the production mode of the cloud environment. The method further comprising after completing the first transition, causing regeneration of the first secret to form a new first secret. The method further comprising assigning the new first secret to the active secret role for the first instance of the service. The method further comprising after the new first secret is in the active secret role for the first instance, initiating a second transition of the first instance from the staging mode to the production mode and the second instance from the production mode to the staging mode of the cloud environment.

Embodiment 9. The method of any of the above embodiments, wherein the second instance of the service is operating in the staging mode of the cloud environment at a time when the rotation of the first secret is initiated.

Embodiment 10. The method of embodiment 9, wherein, at the time when the rotation of the first secret is initiated, the second secret is in a backup secret role for the second instance of the service.

Embodiment 11. The method of any of the above embodiments, wherein ending a secret relationship between the first secret and the second instance of the service comprises assigning the second secret to the active secret role and a backup secret role for the second instance of the service.

Embodiment 12. The method of any of the above embodiments, further comprising, after the second transition, assigning the new first secret to the active secret role for the second instance.

Embodiment 13. The method of any of the above embodiments, wherein the method further comprises, after the first instance of the service is in the staging mode, assigning the second key to a backup secret role and the active secret role for the first instance.

Embodiment 14. The method of any of the above embodiments, wherein assigning the new first secret to the active secret role for the first instance of the service comprises restarting the first instance.

Embodiment 15. The method of any of the above embodiments, wherein assigning a new role to an existing secret does not require restarting a service instance.

Embodiment 16. A system comprising one or more hardware processors and one or more computer-readable media having executable instructions embodied thereon, which, when executed by the one or more processors, cause the one or more hardware processors to execute actions comprising, while a second instance of a service is in a staging mode and a first instance of the service is in a production mode in a cloud environment, terminating a relationship between a first secret and the second instance of the service. The actions further comprising reassigning a second secret from a backup secret role to an active secret role for the second instance of the service. The actions further comprising initiating a first transition of the first instance from the production mode to the staging mode of the cloud environment and the second instance from the staging mode to the production mode of the cloud environment. The actions further comprising after completing the first transition, causing regeneration of the first secret to form a new first secret. The actions further comprising assigning the new first secret to the active secret role for the first instance of the service. The actions further comprising, after the new first secret is in the active secret role for the first instance, initiating a second transition of the first instance from the staging mode to the production mode and the second instance from the production mode to the staging mode of the cloud environment.

Embodiment 17. The system of any of the above embodiments, further comprising, after the second transition, assigning the new first secret to the active secret role for the second instance.

Embodiment 18. The system of any of the above embodiments, wherein the first secret is in the active secret role for the first instance and the second instance when the second secret is assigned to the active secret role for the second instance of the service.

Embodiment 19. The system of any of the above embodiments, wherein assigning the new first secret to the active secret role for the first instance of the service comprises restarting the first instance.

Embodiment 20. The system of any of the above embodiments, wherein assigning a new role to an existing secret does not require restarting a service instance.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more computer storage media comprising computer-executable instructions that when executed by a computing device cause the computing device to perform a method of rotating a secret without disrupting access to a service that is authenticated by the secret, the method comprising:

initiating a secret rotation process for a first secret that is in an active secret role for both a first instance of a service and a second instance of the service;

assigning a second secret to the active secret role for a second instance of the service;

after assigning the second secret to the active secret role for the second instance, initiating
    (1) a first transition of the first instance from a production mode to a staging mode of a cloud environment and
    (2) the second instance from the staging mode to the production mode of the cloud environment;

after completing the first transition, causing regeneration of the first secret to form a new first secret;

assigning the new first secret to the active secret role for the first instance of the service; and after the new first secret is in the active secret role for the first instance, initiating
    (1) a second transition of the first instance from the staging mode to the production mode and (2) the second instance from the production mode to the staging mode of the cloud environment.

2. The media of claim 1, wherein, at the time when the determining that the secret rotation process is to be initiated occurs, the second instance of the service is operating in the staging mode of the cloud environment.

3. The media of claim 2, wherein, at the time when the determining that the secret rotation process is to be initiated occurs, the first secret is in the active secret role for the second instance of the service and the second secret is in a backup secret role for the second instance of the service.

4. The media of claim 1, wherein the method further comprises assigning the second secret to the active secret role for the first instance of the service after the first instance is in the staging mode.

5. The media of claim 4, wherein the method further comprises assigning the second key to a backup secret role for the first instance after the first instance is in the staging mode.

6. The media of claim 1, wherein assigning a new role to an existing secret does not require restarting a service instance.

7. The media of claim 1, wherein assigning the new first secret to the active secret role for the first instance of the service comprises restarting the first instance.

8. A method of rotating a secret without disrupting access to a service that is authenticated by the secret, the method comprising:
   initiating rotation of a first secret assigned to an active secret role for a first instance of a service and a second instance of the service;
   while the second instance of the service is in a staging mode and the first instance of the service is in a production mode of a cloud environment, ending a relationship between the first secret and the second instance of the service;
   initiating a first transition of
      (1) the first instance from the production mode to the staging mode of the cloud environment and
      (2) the second instance from the staging mode to the production mode of the cloud environment;
   after completing the first transition, causing regeneration of the first secret to form a new first secret;
   assigning the new first secret to the active secret role for the first instance of the service; and
   after the new first secret is in the active secret role for the first instance, initiating a second transition of
      (1) the first instance from the staging mode to the production mode and
      (2) the second instance from the production mode to the staging mode of the cloud environment.

9. The method of claim 8, wherein the second instance of the service is operating in the staging mode of the cloud environment at a time when the rotation of the first secret is initiated.

10. The method of claim 9, wherein, at the time when the rotation of the first secret is initiated, the second secret is in a backup secret role for the second instance of the service.

11. The method of claim 8, wherein ending a secret relationship between the first secret and the second instance of the service comprises assigning the second secret to the active secret role and a backup secret role for the second instance of the service.

12. The method of claim 8, further comprising, after the second transition, assigning the new first secret to the active secret role for the second instance.

13. The method of claim 8, wherein the method further comprises, after the first instance of the service is in the staging mode, assigning the second key to a backup secret role and the active secret role for the first instance.

14. The method of claim 8, wherein assigning the new first secret to the active secret role for the first instance of the service comprises restarting the first instance.

15. The method of claim 8, wherein assigning a new role to an existing secret does not require restarting a service instance.

16. A system comprising:
   one or more hardware processors; and
   one or more computer-readable media having executable instructions embodied thereon, which, when executed by the one or more processors, cause the one or more hardware processors to execute actions comprising:
   while a second instance of a service is in a staging mode and a first instance of the service is in a production mode in a cloud environment, terminating a relationship between a first secret and the second instance of the service;
   reassigning a second secret from a backup secret role to an active secret role for the second instance of the service;
   initiating a first transition of
      (1) the first instance from the production mode to the staging mode of the cloud environment and
      (2) the second instance from the staging mode to the production mode of the cloud environment;
   after completing the first transition, causing regeneration of the first secret to form a new first secret;
   assigning the new first secret to the active secret role for the first instance of the service; and
   after the new first secret is in the active secret role for the first instance, initiating a second transition of
      (1) the first instance from the staging mode to the production mode and the second instance from
      (2) the production mode to the staging mode of the cloud environment.

17. The system of claim 16, further comprising, after the second transition, assigning the new first secret to the active secret role for the second instance.

18. The system of claim 16, wherein the first secret is in the active secret role for the first instance and the second instance when the second secret is assigned to the active secret role for the second instance of the service.

19. The system of claim 16, wherein assigning the new first secret to the active secret role for the first instance of the service comprises restarting the first instance.

20. The system of claim 16, wherein assigning a new role to an existing secret does not require restarting a service instance.

* * * * *